United States Patent [19]

Weger, Jr.

[11] Patent Number: 4,618,083

[45] Date of Patent: Oct. 21, 1986

[54] LADDER CLAMPING DEVICE FOR VEHICLE RACK

[75] Inventor: Kenneth F. Weger, Jr., Cary, Ill.

[73] Assignee: Knaack Mfg. Co., Crystal Lake, Ill.

[21] Appl. No.: 775,505

[22] Filed: Sep. 12, 1985

Related U.S. Application Data

[63] Continuation of Ser. No. 611,350, May 17, 1984, abandoned.

[51] Int. Cl.$^4$ .............................................. B60R 9/00
[52] U.S. Cl. .................................... 224/324; 224/309
[58] Field of Search ............... 224/324, 329, 323, 310

[56] References Cited

U.S. PATENT DOCUMENTS 3,700,199  10/1972  Matuska .......................... 248/240 X

OTHER PUBLICATIONS

Adrian Steel Company, Modular Catalog 7M75.
Adrian Steel Company, Installation Instructions for Heavy Duty Ladder Rack Assemblies, Form II-00-01-5.
Crown, Crown Job Vans Catalog.
Masterack, Masterack Catalog.
Nevlen, Nevlen Roof Accessories Catalog, 1977.
Stahl Metal Products, Stahl Van Style Ladder Racks Catalog, Form No. 7507.
Stabilus GMBH, Gas Spring Installation Example Sheets, SN. 03.02-00/03.

Primary Examiner—Stephen Marcus
Assistant Examiner—Robert Petrik
Attorney, Agent, or Firm—Leydig, Voit & Mayer, Ltd.

[57] ABSTRACT

A vehicle rack having frame members and a clamping device for securing a ladder to the frame members. The clamping device comprises a first clamp rigidly connected to one frame member to receive one of the rungs of the ladder, and a second clamp for engaging another rung of the ladder. The second clamp is rigidly connected to a rotatable rod to which a handle as connected. A link is provided for interconnecting the rod and a spring, the arrangement of the link and the member being such that the second clamp is biased alternatively in the engaged and disengaged positions so that moving the handle in one direction will cause the second clamp to engage a rung of the ladder, the second clamp being urged in the engaged position by the spring. While moving the handle in the other direction will cause the second clamp to disengage, the spring then urging the second clamp in the disengaged position.

8 Claims, 5 Drawing Figures

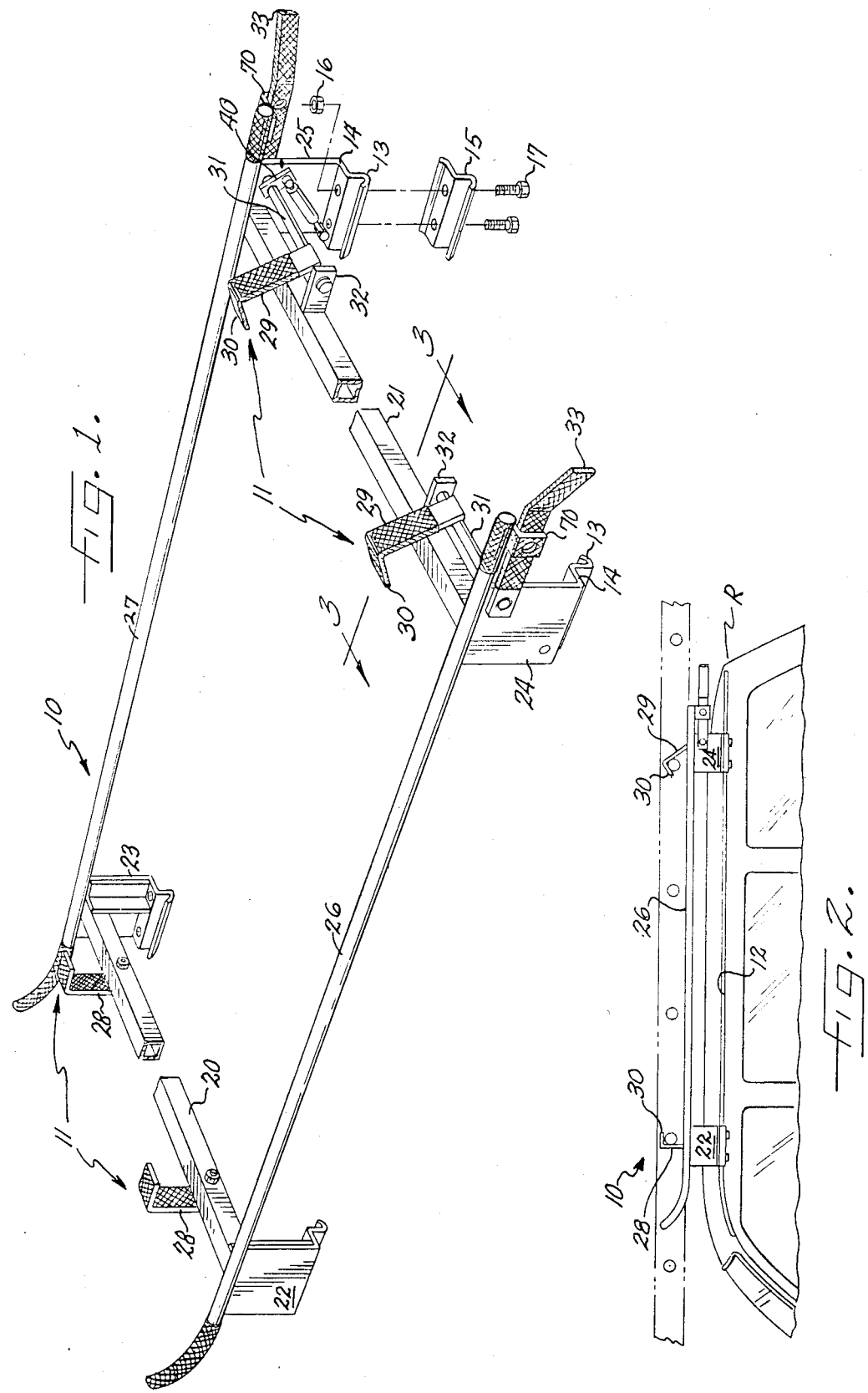

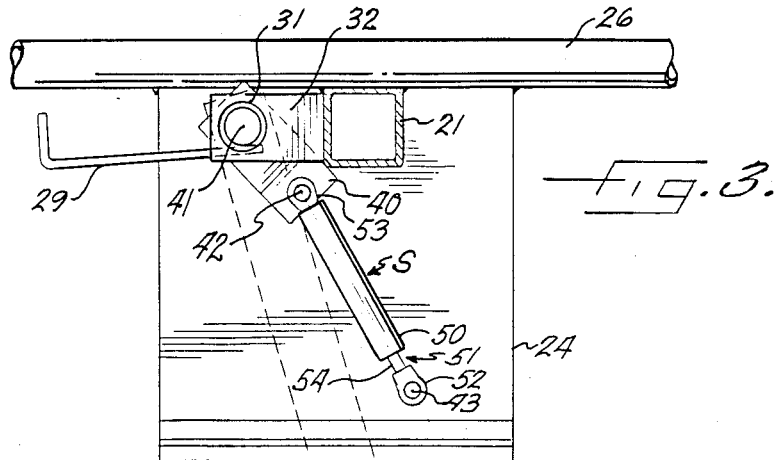
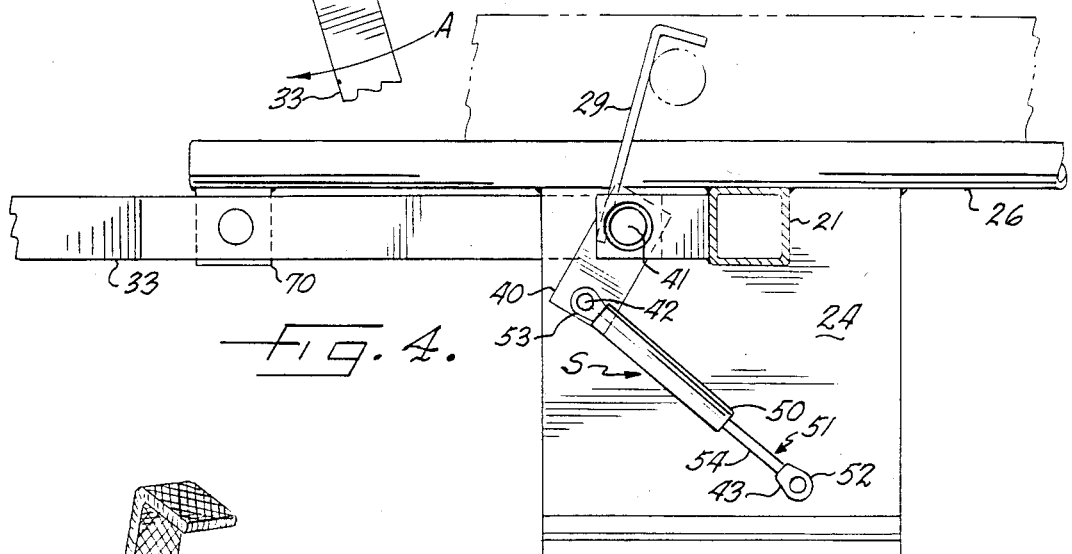
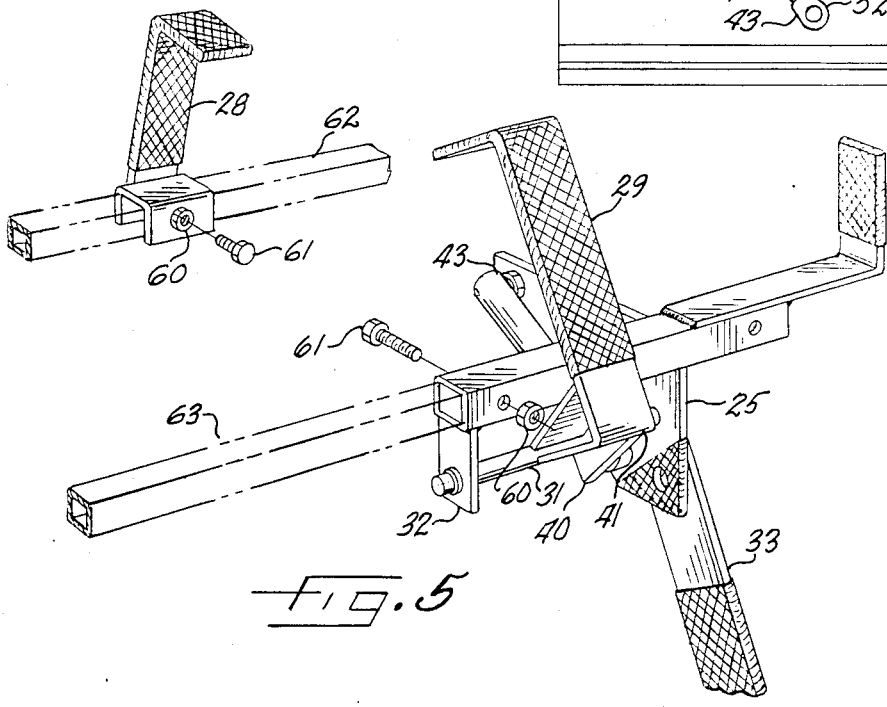

LADDER CLAMPING DEVICE FOR VEHICLE RACK

This is a continuation of application Ser. No. 611,350, filed May 17, 1984, now abandoned.

This invention relates generally to retaining devices for securing ladders to racks adapted to be mounted on trucks or other motor vehicles.

BACKGROUND OF THE INVENTION

It has become conventional practice for carrying ladders and the like on racks mounted on motor vehicles to provide the rack with mechanical clamping members to secure the ladder to the rack. Such clamping members eliminate the need for ropes and elastic ties, which may loosen or break during use, with the resulting possibility the ladder may fall from the rack and cause damage or be damaged itself.

In practice, however, known clamping arrangements may suffer from numerous disadvantages. They can be heavily sprung and cumbersome, and therefore difficult to latch or unlatch, particularly where the user has limited strength. In addition, they may protrude from the rack, making sliding and placement of the ladder difficult and clumsy. The clamping members can also be complicated, employing numerous linkages and rotating handles, which can add to the expense of manufacture and increase the likelihood of failure.

Another problem that has arisen in the use of clamping members is the inadvertent closing of the clamping members when the ladder is being placed on the rack. This problem occurs where the clamping members are biased in the closed position and manually held open to receive a rung of the ladder. If the user is unable to hold the clamping member open continuously it may close prematurely, possibly damaging the clamping member or the ladder, and/or causing significant injury to the user, such as where the user's hands are disposed at the rung to be engaged by the retaining device when the inadvertent movement occurs.

Accordingly, it is an object of the present invention to provide a clamping arrangement for securing a ladder to a vehicle rack which is reliable and simple to operate. It is a related object of the invention to provide a clamping arrangement which does not protrude beyond the top surface of the rack when the ladder is moved into position.

It is a further object of the invention to provide a clamping arrangement which is biased to remain open when the ladder is placed on the rack, and is also biased to hold the ladder securely and reliably in place once the clamping arrangement is closed or engaged.

It is yet another object of the invention to provide a clamping arrangement which is inexpensive to maintain and to manufacture, and which may be adapted to a variety of ladder racks normally available in the marketplace.

It is also an object of the invention to provide a clamping arrangement which is quick and simple to secure in position and which is inherently durable and long lived.

Other objects and advantages of the invention will become apparent upon reading the following detailed description and upon reference to the drawings.

BRIEF DESCRIPTION OF THE DRAWINGS

FIG. 1 is a perspective view of a clamping device according to the present invention adapted for use on a ladder rack;

FIG. 2 is a side elevation illustrating one way in which the ladder rack with the clamping device may be mounted on an automobile, step van or the like;

FIG. 3 is a plan view taken along the line 3—3 in FIG. 1 of the clamping device of the present invention in the open and disengaged position;

FIG. 4 is a view similar to that of FIG. 3 showing the clamping device of the present invention in the closed and engaged position; and FIG. 5 is a perspective exploded view of an alternate embodiment of the clamping device for retrofitting existing ladder racks.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the appended claims.

Turning now to the drawings, there is shown in FIGS. 1 and 2 a vehicle rack denoted generally as 10 and incorporating the clamping devices 11 of the present invention. The clamping devices depicted in these figures are advantageously employed in securing ladders to a vehicle rack, as illustrated in FIG. 2, where a quick and reliable attachment is required. In the embodiment shown, the rack is mounted to the roof of a motor vehicle denoted generally as R by gripping the rain gutter 12 at multiple locations between the rolled edge 13 of the mounting plate 14 and the base plate 15 with a nut 16 and bolt 17. One skilled in the art, however, will appreciate that other means for mounting the rack to a motor vehicle may be employed without departing from the spirit or scope of the present invention.

As best illustrated in FIG. 1, the generally rectangular rack 10 includes substantially horizontal, transverse frame members 20, 21, which bridgingly extend between respective left and right corner positions denoted generally as 22, 23, 24 and 25. Longitudinal and horizontally disposed side members 26, 27 extend between respective front and rear corner positions and add stability to the overall structure. It is contemplated, but not shown in the drawings, that members 20, 21, 26 and 27 may include provision for telescopic adjustment. In this way, the ladder rack can be quickly and easily adjusted to fit a variety of motor vehicles having different rooftop dimensions.

Referring again to FIG. 1, two clamping devices 11 are shown, one at each side of the rack 10, thus permitting the rack to carry several ladders. The ladders are secured to the rack by placing one rung tightly against clamp 28, which is rigidly connected to frame member 20, and by closing clamp 29 so that it engages yet another rung of the ladder. In this way, the ladder is held in compression between the two clamps 28 and 29. Vertical movement of the ladder from the rack is further constrained by flanges 30.

If desired, clamp 28 may be mounted to a piece of tubing that slides on frame member 20. The piece of tubing may be rigidly connected to frame member 20 so that clamp 28 can be adjusted to secure ladders of various widths. Additionally, if desired, clamp 28 may be bent in the direction of frame member 21 so that flange 30 forms an acute angle with the horizontal.

Turning now to FIG. 3, there is shown clamp 29 and means for opening and closing the clamp so as to secure a ladder to the vehicle rack 10. Clamp 29 is rigidly connected to rod 31, which is shown more clearly in FIG. 1. Rod 31 is in substantially parallel alignment with frame member 21 and is mounted with provision for rotational movement between a bracket 32 and corner position 24. As best shown in FIG. 1, rod 31 extends through corner position 24, at which point a handle 33 is secured thereto to facilitate the rotation of the rod 31.

According to the invention, one point of a link 40 is rigidly connected to rod 31 at a first linkage point 41. A short distance away, a second point of the link 40 is pivotally connected to one end of a spring denoted generally as S at a second linkage point 42. As shown in the figures, the other end of the spring S is pivotally mounted to the corner position 24 at a third linkage point 43. The arrangement of the linkage points shown in FIG. 3 is such that the clamp 29 is biased in the open and disengaged position.

Moving the handle 33 in the direction of arrow A will rotate rod 31, thus causing the clamp 29 to move to the closed and engaged position as shown in FIG. 4. When this occurs, linkage point 42 is moved through the line substantially defined by linkage points 41 and 43. This arrangement of the linkage points causes the force of the spring S to urge the clamp 29 in a closed and engaged position against a rung of the ladder. As will be apparent from the drawings, and in keeping with the objects of the invention, the arrangement of the linkage points is such that clamp 29 will be urged toward a rung of the ladder anytime the linkage point 42 is moved through the line substantially defined by linkage points 41 and 43. This permits the clamping device to accommodate different size ladders, with varying distance between the rungs, without requiring adjustment or repositioning of the corner positions 22, 23 24 and 25.

An alternate embodiment of the clamping device suitable for retrofitting existing ladder racks is shown in FIG. 5. It is contemplated that the clamping device would be bolted directly to the frame members extending between the respective corner positions of the existing ladder racks. FIG. 5 illustrates one manner in which nuts and bolts 60, 61 may be used to connect clamps 28, 29 to the existing frame members 62, 63. In making this connection, however, it should be understood that the length of frame members 62, 63 may have to be adjusted to ensure safe and reliable ladder attachment.

FIG. 5 depicts clamp 29 of the clamping device at corner position 25, and linkage points 41 and 43 are inverted with respect to those in FIG. 4, however the clamping devices illustrated in FIGS. 4 and 5 work in a similar fashion. Both are alternatively biased in the open and closed positions when linkage point 42 (not shown in FIG. 5) is moved through the line substantially defined by linkage points 41 and 43.

Stops may also be provided to constrain the movement of clamp 29. As shown in FIG. 1, stop 70 limits the upward movement of handle 33, thereby limiting the rotation of rod 31 and effectively preventing further movement of clamp 29 in the closed position beyond that shown in FIGS. 1 and 4. Similarly, as shown in FIG. 3, link 40 may be configured to contact frame member 21 at point 71, thereby effectively preventing further movement of clamp 29 in the open position beyond that shown in FIG. 3. In addition, stop 70 and handle 33 may be provided with corresponding holes for the insertion of a padlock or the like to prevent the theft of the ladder while the vehicle is unattended.

To obtain the dual benefits of reliability and long life, the ladder rack and clamping device are preferably made of steel, which is then suitably protected to resist corrosion, as with an electrostatically applied powder coating. In addition, the clamps 28, 29 may be vinyl dipped to protect the ladder from chafing or splintering when the clamp is engaged. Other portions of the ladder rack and clamping device may also be vinyl dipped to provide the user with a clean grip and protection from sharp, exposed edges. Vinyl dipping is shown in the drawings as dark shading.

As indicated above, the invention comprehends the provision of an expansible spring for biasing the clamping device alternatively in the engaged and disengaged positions. In the illustrated embodiments, the expansible spring comprises an elongated longitudinally extending gas spring of known construction, though one skilled in the art will appreciate that other spring means may be employed without departing from the spirit or scope of the appended claims. As shown in FIGS. 3 and 4, the spring S includes a pressure cylinder 50 in which is received a piston assembly 51 extending downwardly from the lower end of the pressure cylinder and having a lower connection 52 pivotably mounted at linkage point 43. The upper end of the pressure cylinder 50 has a connection 53 which is pivotally connected to link 40 at linkage point 42.

In the illustrated embodiments, the connectors 52, 53 are preferably formed of a synthetic resin so as to be weaker than the piston rod 54 which may be formed of mild steel so as to be somewhat flexible. Thus, in the event of impact forces and the like, the connectors will fracture rather than the piston rod, thereby effectively preventing damage to the gas spring.

I claim as my invention:

1. A rack which supports a ladder and which is mountable to a vehicle, said vehicle rack comprising:
   first and second pairs of first and second corner positions;
   first and second transverse frame members extending bridgingly between the first and second corner positions of the first and second pairs of corner positions, respectively;
   a first clamp mounted to the first frame member for engaging one rung of the ladder;
   a rod rotatably mounted to at least one of the corner positions between which the second frame member extends, said rod extending from said one corner position parallel to the second frame member;
   a second clamp mounted to the rod;
   handle means rigidly connected to the rod for rotating the second clamp in a first direction into engagement with another rung of the ladder or in the opposite direction out of engagement with said another rung of the ladder;
   a link proximate said one corner position and rigidly connected at a first linkage point to the rod and rotatable therewith; and
   spring means pivotally mounted at a second linkage point to the link and at a third linkage point to said one corner position for biasing the link in the first rotational direction when the second linkage point lies on one side of a line between the first and third linkage points and for biasing the link in the opposite rotational direction when the second linkage point lies on the other side of the line between the first and third linkage points.

2. The vehicle rack as claimed in claim 1 wherein first and second longitudinal side members extend in horizontal position between the first corner positions and between the second corner positions, respectively.

3. The vehicle rack as claimed in claim 1 wherein the spring means is a gas spring.

4. The vehicle rack as claimed in claim 1 wherein rotation of the rod is constrained by at least one stop.

5. The vehicle rack as claimed in claim 4 wherein the handle means contacts a stop thereby constraining the rotation of the rod.

6. The vehicle rack of claim 4 wherein the link contacts a stop comprising the second frame member, thereby constraining the rotation of the rod.

7. The vehicle rack as claimed in claim 4 wherein the handle means contacts a stop, thereby constraining rotation of the rod in one direction, and the link contacts a second stop comprising the second frame member, thereby constraining the rotation of the rod in the other direction.

8. The vehicle rack as claimed in claim 1 wherein the second clamp and the handle means for rotating the rod is located below the second frame member and the space above is unobstructed when the second clamp is in the disengaged position.

* * * * *